(12) United States Patent
Lin et al.

(10) Patent No.: US 8,425,067 B2
(45) Date of Patent: Apr. 23, 2013

(54) COMPOSITE DIFFUSER STRUCTURE AND BACKLIGHT MODULE

(75) Inventors: Cheng Lin, Taipei (TW); Jen-Huai Chang, Pingjhen (TW); Jyh Horng Wang, Pingjhen (TW)

(73) Assignee: Entire Technology Co., Ltd., Taoyuan County (TW)

( * ) Notice: Subject to any disclaimer, the term of this patent is extended or adjusted under 35 U.S.C. 154(b) by 756 days.

(21) Appl. No.: 12/591,461

(22) Filed: Nov. 20, 2009

(65) Prior Publication Data
US 2011/0122599 A1     May 26, 2011

(51) Int. Cl.
*G09F 13/04*     (2006.01)
*F21V 11/00*     (2006.01)

(52) U.S. Cl.
USPC ............................ 362/97.1; 362/355; 362/97.2

(58) Field of Classification Search ........ 362/97.1–97.3, 362/355, 600–631
See application file for complete search history.

(56) References Cited

U.S. PATENT DOCUMENTS

| | | | | |
|---|---|---|---|---|
| 5,276,504 A * | 1/1994 | Zwirner et al. | ............... | 356/638 |
| 7,393,130 B2 * | 7/2008 | Hasei | ............... | 362/619 |
| 7,771,091 B2 * | 8/2010 | Etori | ............... | 362/335 |
| 7,806,547 B2 * | 10/2010 | Benitez et al. | ............... | 362/97.3 |
| 8,157,410 B2 * | 4/2012 | Park | ............... | 362/240 |
| 2007/0279939 A1 * | 12/2007 | Hirata et al. | ............... | 362/616 |

* cited by examiner

*Primary Examiner* — Anabel Ton
(74) *Attorney, Agent, or Firm* — Rosenberg, Klein & Lee (57) ABSTRACT

A composite diffuser structure includes a transparent layer having a light-entering surface and a light-emitting surface, a lenticular structure having a plurality of lenticular lens formed on the light-emitting surface, and a plurality of refection structures located on the light-entering surface. Each of the lenticular lenses has a first width. There is an opening between two adjacent reflection structures. Each of the openings has a second width. Thereby, the light beam enters into the transparent layer via the opening to increase the light efficiency. By using the diffuser layer located above the lenticular structure, the view angle can be adjusted.

18 Claims, 8 Drawing Sheets

COMPOSITE DIFFUSER STRUCTURE AND BACKLIGHT MODULE

BACKGROUND OF THE INVENTION

1. Field of the Invention

The present invention relates to a composite diffuser structure and a backlight module. In particular, the present invention relates to a composite diffuser structure and a backlight module which can increase both of the brightness and the view angle.

2. Description of Related Art

Generally, a light beam is outputted form a light source and is emitted via a diffuser. However, the direction of the light beam emitted from the diffuser become worse. Therefore, a prism is used for modifying the direction of the light beam. The principle is to focus the light beam and increase the front brightness by utilizing the light refraction and the light reflection to improve the efficiency of the light beam emitted from the diffuser. However, by using this way, the backlight source is over-focused so that the view angle of the display screen is restricted. This means that users need to observe frames of the display screen within limited viewing angles, otherwise, the frames displayed by the display screen can not be observed clearly. Consequently, it is inconvenient for users.

Figure 1A:
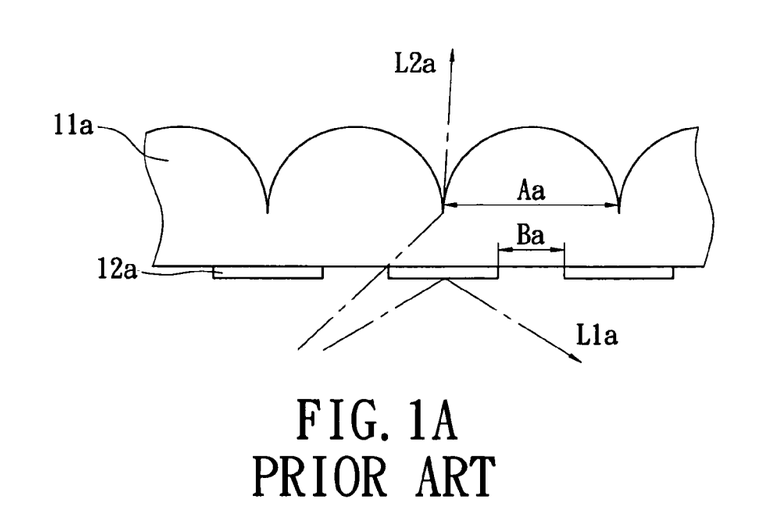
FIG. 1A is a schematic diagram of the light beam passing through the rectangular reflection structures that protrude downwards and the lenticular structure.

Reference is made to FIG. 1A. By using the plurality of rectangular reflection structures 12a that protrudes downwards and the lenticular structure 11a, two effects are achieved. Firstly, when the incident light L1a is emitted to the structure, the incident light L1a is directly reflected by the rectangular reflection structures 12a that protrude downwards and is returned back to the light source. Secondly, when the incident light L2a is emitted to the structure, the incident light L2a is refracted by the lenticular structure 11a to generate a projection light that is upward. Therefore, the brightness of the front view angle is increased.

Figure 1B:
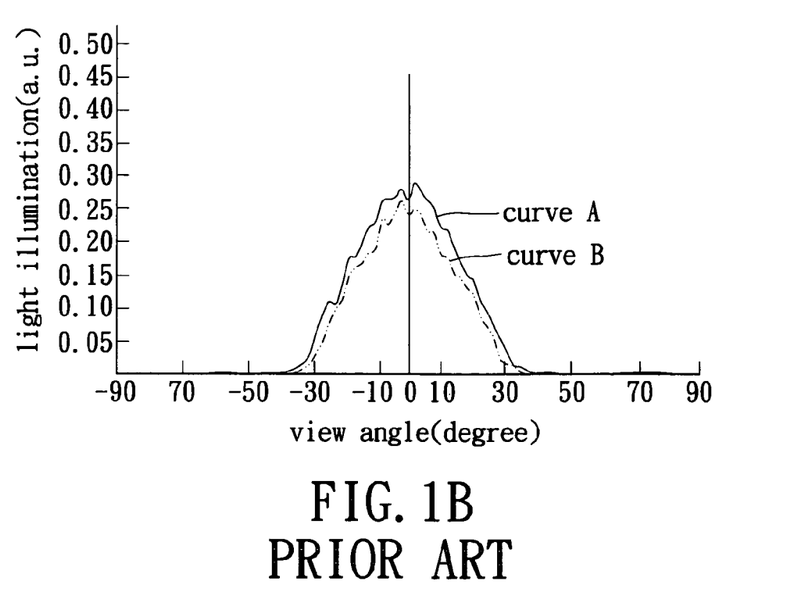
FIG. 1B is a coordinate diagram of the view angle (degree) and the light illumination (a.u.) by using the plurality of rectangular reflection structures that protrudes downwards and the lenticular structure.

Reference is made to FIG. 1B, which shows the coordinate diagram of the view angle (degree) and the light illumination (a.u.) by using the lenticular structure 11a in conjunction with the plurality of rectangular reflection structures 12a that protrudes downwards. Two curves are displayed.

(1) The simulation parameters of the curve A are: the plurality of rectangular reflection structures 12a that protrudes downwards is used, wherein the opening rate thereof (the second width Ba is 1/2.5 first width Aa) is 0.4, and the thickness of the lenticular structure 11a is 128 µm calculated from the wave trough.

(2) The simulation parameters of the curve B are: the plurality of rectangular reflection structures 12a that protrudes downwards is used, wherein the opening rate thereof (the second width Ba is 1/3 first width Aa) is 0.3, and the thickness of the lenticular structure 11a is 128 µm calculated from the wave trough.

However, from the above curves, by using the plurality of rectangular reflection structures 12a that protrudes downwards and the lenticular structure 11a, the brightness of the front view angle is still inadequate.

SUMMARY OF THE INVENTION

One particular aspect of the present invention is to provide a composite diffuser structure and a backlight module, so that the light efficiency is improved. The scattering light beam over a big range of angles is focused to increase the front view illumination of the display screen.

Another particular aspect of the present invention is to provide a composite diffuser structure and a backlight module that the diffusivity of the light beam can be adjusted according to the requirements, so that the view angle of the display screen is enlarged.

To achieve the aforementioned objectives, the composite diffuser structure includes a transparent layer having a light-entering surface and a light-emitting surface, a lenticular structure having a plurality of lenticular lens formed on the light-emitting surface, and a plurality of refection structures located on the light-entering surface. Each of the lenticular lenses has a first width. There is an opening between two adjacent reflection structures. Each of the openings has a second width. The second width is between one third of first width and one hundredth of first width.

The present invention has the following beneficial characteristics. The composite diffuser structure of the present invention has a reflection structure that can increase the light efficiency, and solve the problem of the view angle being too narrow due to the light is focused. The backlight module with the composite diffuser structure can provide the light beam that its front brightness is high and its view angle is adjustable.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

Figure 2:
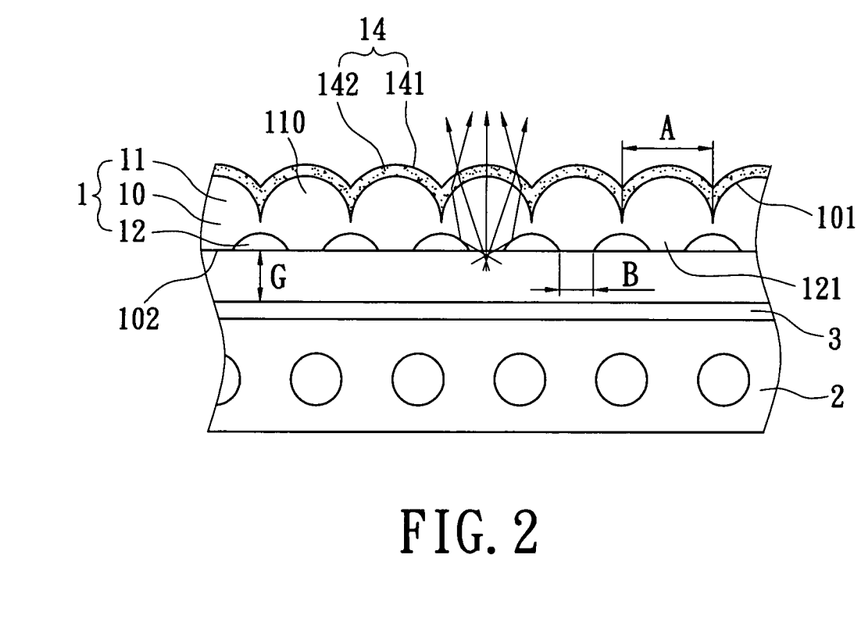
FIG. 2 is a schematic diagram of the composite diffuser structure and the backlight module of a first embodiment of the present invention.

Reference is made to FIG. 2, which shows a composite diffuser structure 1 of a first embodiment of the present invention. The composite diffuser structure 1 includes a transparent layer 10 having a light-entering surface 102 and a light-emitting surface 104, a lenticular structure 11 having a plurality of lenticular lens 110 formed on the light-emitting surface 101, and a plurality of refection structures 12 located on the light-entering surface 102. Each of the lenticular lenses 110 has a first width A. There is an opening 121 between two adjacent reflection structures 12. Each of the openings 121 has a second width B.

Before the transparent layer 10 is produced, the transparent layer 10 is a transparent plastic material. After a series of manufacturing processes are performed, the lenticular structure 11 is formed on the light-emitting surface 101. The shape of the light-emitting surface 101 is in the arc-shape or in shapes of the other lenticular lens 110.

The composite diffuser structure 1 is applied to a backlight module. The composite diffuser structure 1 is located ahead of the diffuser unit 3 so as to increase the brightness and the diffusivity. Therefore, the brightness and the quality of the display screen are enhanced.

The structure and the components of the composite diffuser structure 1 are illustrated as below. The transparent layer 10 is made of, but not limited to, material with high refraction index, such as polycarbonate (PC), polyethylene naphthalate (PEN), or polyethylene terephthlate (PET). After the transparent layer 10 are processed by the positioning and pressing processes, the light-emitting surface 101 of the transparent layer 10 is formed as a lenticular structure 11. The lenticular structure 11 includes a plurality of lenticular lenses 110 that are made of material with high refraction index. The shapes of the lenticular lenses 110 can be in a semicircular-shape, an elliptical-shape, a triangular-shape, or other shapes that can focus the light beam, but not limited thereto.

Figure 3A:
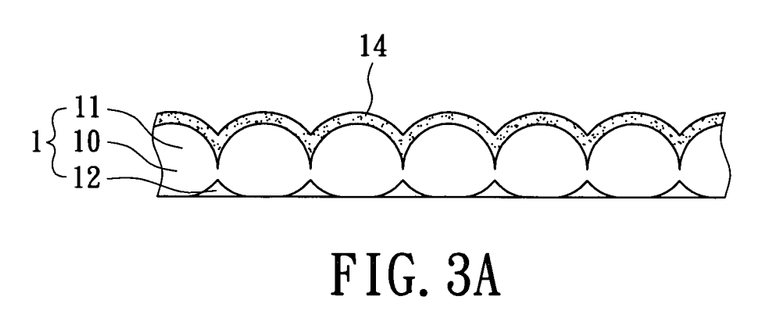
FIG. 3A is a schematic diagram of the triangle reflection structure of the composite diffuser structure of the first embodiment of the present invention.
Figure 3B:
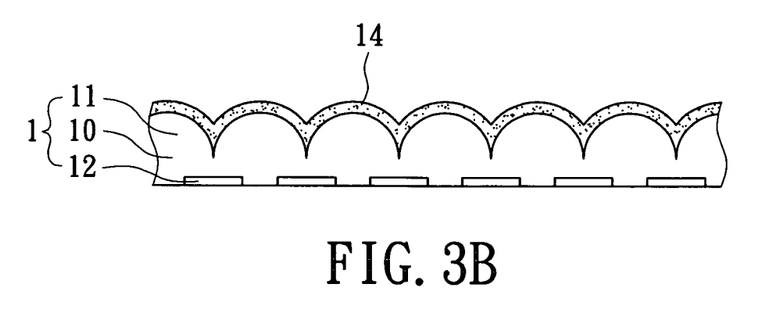
FIG. 3B is a schematic diagram of the rectangular reflection structure of the composite diffuser structure of the first embodiment of the present invention.

The light-entering surface 102 of the transparent layer 10 has reflection structures 12. There is an opening 121 between two adjacent refection structures 12. The refection structures 12 are used for limiting the path of the incident light entering the transparent layer 10 so that the light beam is focused, the light efficiency is increased, and the front brightness of the display screen is increased. In this embodiment, the opening 121 is located right below the corresponding lenticular lens 110. Furthermore, the corresponding lenticular lens 110 has a predetermined first width A, and the opening has a predetermined second width B. In one preferred embodiment, the second width B is between 1/3 A and 1/100 A. Thereby, the light beam with a wide angle is sheltered by the reflection structures 12. Additionally, please refer to FIG. 3A and FIG. 3B, the reflection structure 12 can be in a semicircular-shape, an elliptical-shape, a triangular-shape, a rectangular-shape, or other shapes with concave structure (related to the direction of the incident light). By using the reflection structures 12, the light beam with a wide angle can be guided to the desired direction. The reflection structures 12 include $TiO_2$ or other inorganic particles with high refraction index. In this embodiment, the diameter of the particles is between 0.1 μm and 30 μm, and its weight ratio is between 0.1% and 50%.

Figure 3C:
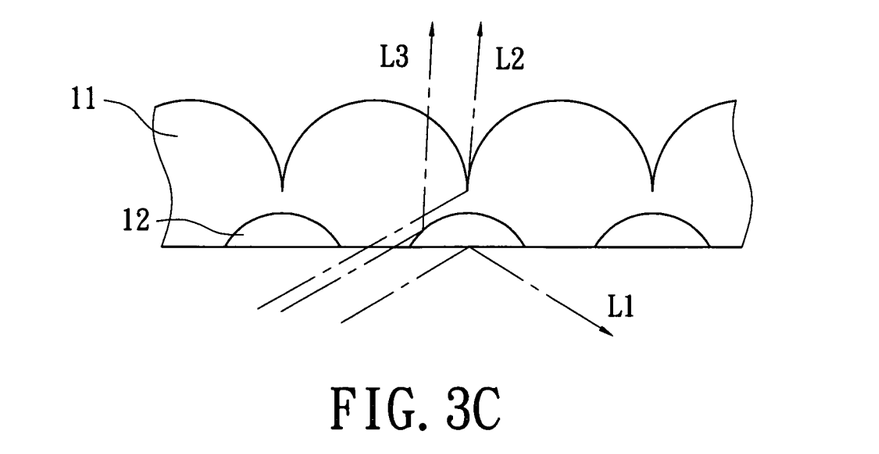
FIG. 3C is a schematic diagram of the light beam passing through semi-circular reflection structure and the lenticular structure of the first embodiment of the present invention.

Reference is made to FIG. 3C. By using the semicircular reflection structures 12 and the lenticular structure 11, some effects are achieved. (1) When the incident light L1 is emitted to the structures, the incident light L1 is directly reflected by the semicircular reflection structures 12 to the light source. (2) When the incident light L2 is emitted to the structures, the incident light L2 is refracted by the lenticular structure 11 to generate a projection light beam that faces upwards. The front view brightness is increased. (3) When the incident light L3 is emitted to side surfaces of the semicircular reflection structures 12, the incident light L3 is reflected by the side surfaces of the semicircular reflection structures 12 to generate a projection light beam that faces upwards. Due to the reflection principle, the front view brightness of the present invention is increased.

Figure 3D:
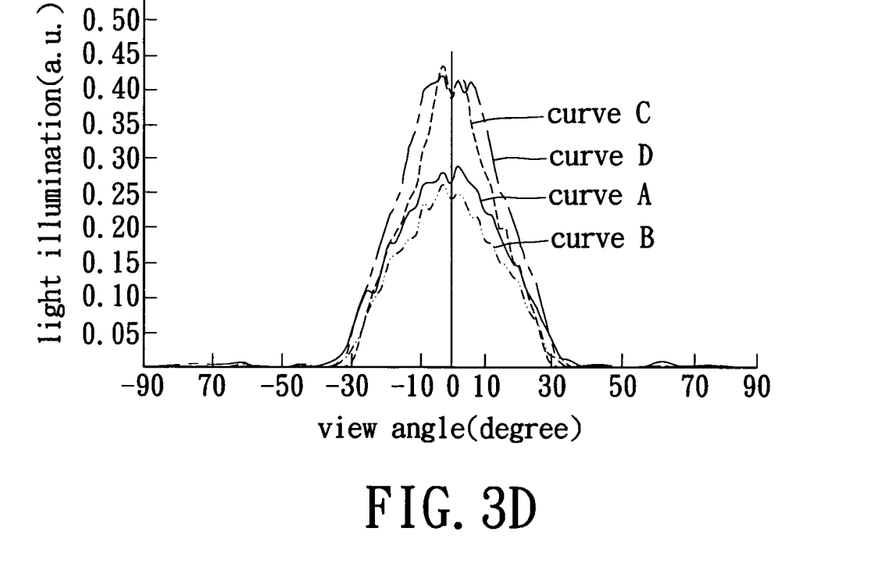
FIG. 3D is a coordinate diagram of the view angle (degree) and the light illumination (a.u.) by using the plurality of reflection structures and the lenticular structure of the first embodiment of the present invention.

Reference is made to FIG. 3D, which shows the coordinate diagram of the view angle (degree) and the light illumination (a.u.) by using the lenticular structure 11 in conjunction with the plurality of semicircular reflection structures 12. Four curves are displayed.

(1) The simulation parameters of the curve C are: the plurality of semicircular reflection structures 12 is used, the opening rate thereof (the second width B is one third of first width A) is 0.3, and the thickness of the lenticular structure 11 is 128 μm calculated from the wave trough.

(2) The simulation parameters of the curve D are: the plurality of semicircular reflection structures 12 is used, the opening rate thereof (the second width B is 1/2.5 first width A) is 0.4, and the thickness of the lenticular structure 11a is 128 μm calculated from the wave trough Therefore, comparing the curves C, D of the present invention with the curves A, B of the prior art, the front view brightness of the plurality of semicircular reflection structures 12 (as shown in FIG. 2 and FIG. 3C) is higher than that of the plurality of rectangular reflection structures 12a that protrudes downwards (as shown in FIG. 1A).

Reference is made to FIG. 2. The composite diffuser structure 1, the light source unit 2 and the diffuser unit 3 form a backlight module. The light source unit 2 emits light beams for the display screen. The light beams processed by the scattering effect of the diffuser unit 3 are scattered. When the light beams meet the reflection structures 12 of the composite diffuser structure 1, the light beams in a wide angle and the scattered incident light will be sheltered by the reflection structures 12, and the light beams that have higher degree of parallelism are emitted into the opening 121. Next, the light beams are emitted from the lenticular lens 110. Thereby, the light beams are focused to increase the front brightness of the display screen.

Above the lenticular structure 11, a diffuser layer 14 is disposed. The diffuser layer 14 includes a transparent material layer 141 and a plurality of particles 142 disposed on the transparent material layer 141. The particles 142 are added into the transparent material layer 141 in a weight ratio of 0.01%~50%. The difference of the refraction indices between the particles 142 and the transparent material layer 141 is between +0.5 and −0.5. The particle 142 is transparent and is made of polymethylmethacrylate (PMMA), polycarbonate (PC), or polystyrene (PS). The diameter of the particles 142 is between 0.5 μm and 30 μm. The material of the transparent material layer 141 can be determined by the manufacturing process. For example, in the pressing process, the transparent material layer 141 is made of polycarbonate (PC), polyethylene naphthalate (PEN), or polyethylene terephthlate (PET). In the coating process, the transparent material layer 141 is made of UV resin, heat-hardening resin, or epoxy, but not limited to thereof. After the light beam is emitted from the lenticular structure 11, the light beam has high degree of parallelism and concentration. However, the view angle may become narrow. Therefore, a diffuser layer 14 is located on the lenticular structure 11 so as to adjust the diffusivity of the light beam and to increase the view angle of the display screen.

In FIG. 2, the composite diffuser structure 1, the light source unit 2 and the diffuser unit 3 are directly adhered together. There is a gap G between the composite diffuser structure 1 and the diffuser unit 3.

Figure 4:
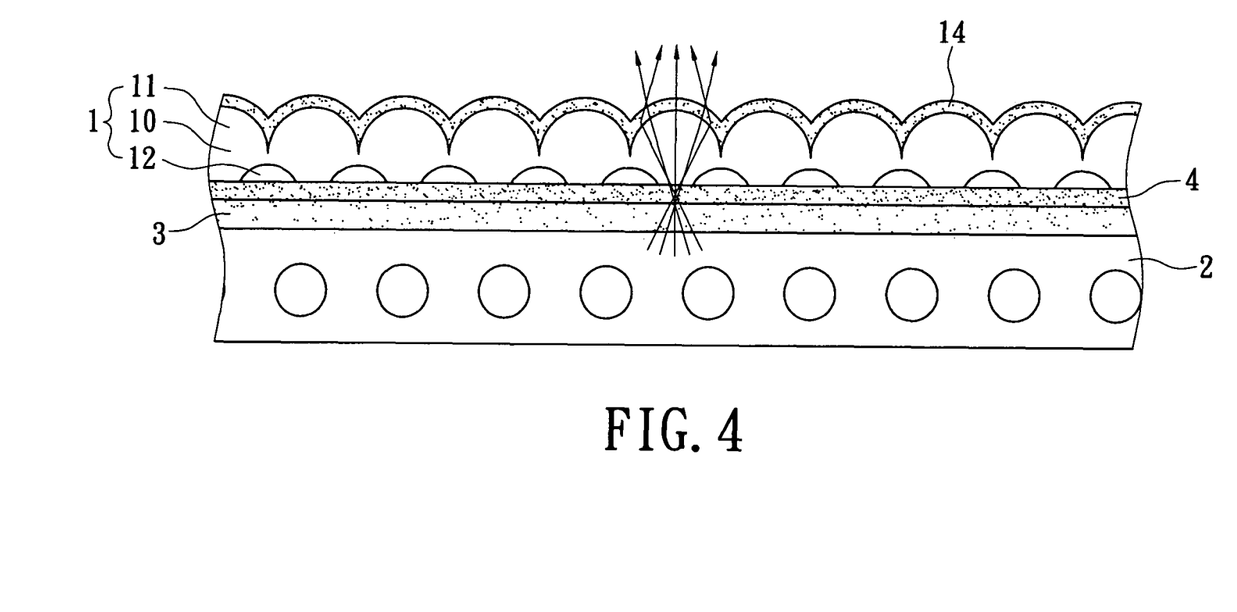
FIG. 4 is a schematic diagram of the composite diffuser structure and the backlight module of a second embodiment of the present invention.
Figure 4A:
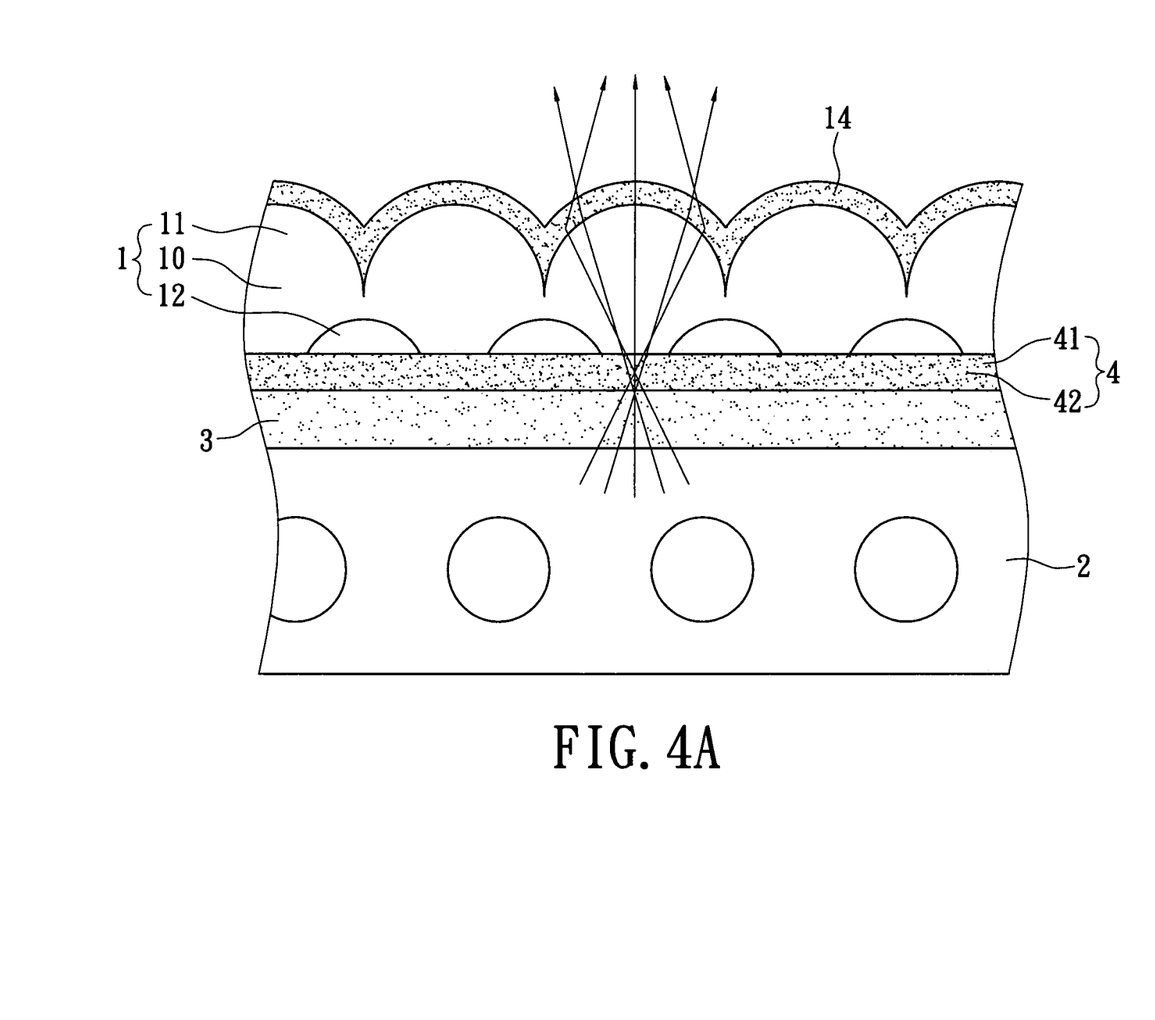
FIG. 4A is an enlarged diagram of the composite diffuser structure and the backlight module of the second embodiment of the present invention.
Figure 5A:
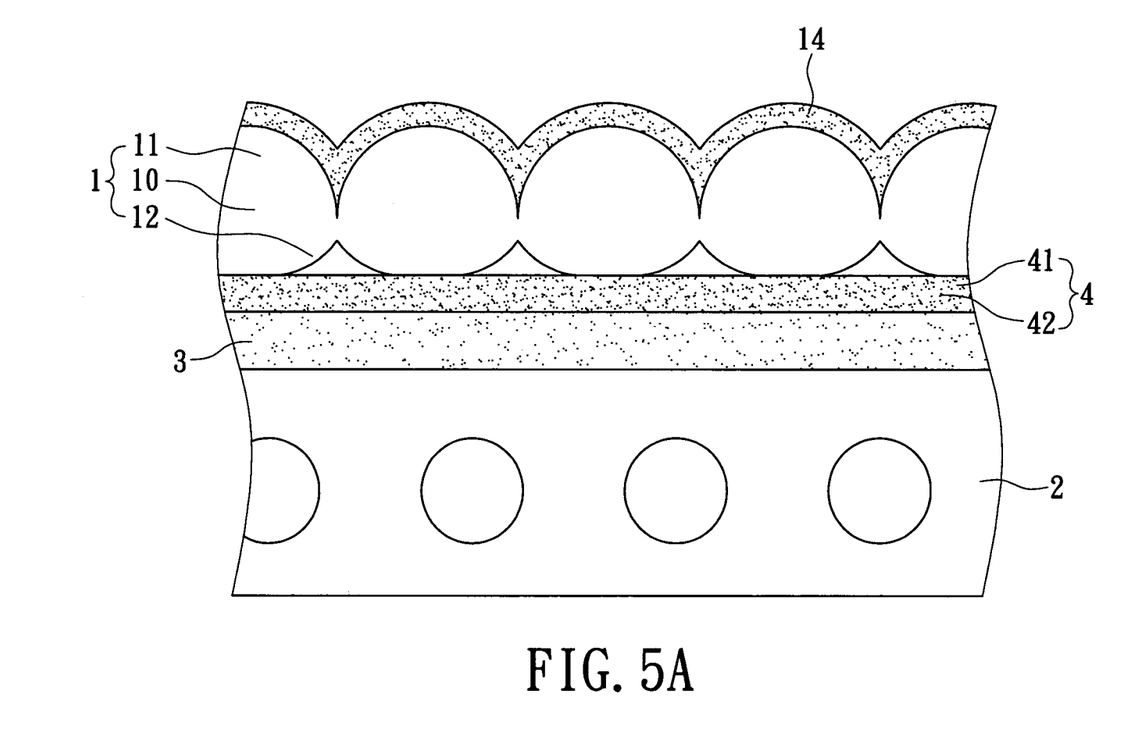
FIG. 5A is a schematic diagram of the triangle reflection structure of the composite diffuser structure and the backlight module of the second embodiment of the present invention.
Figure 5B:
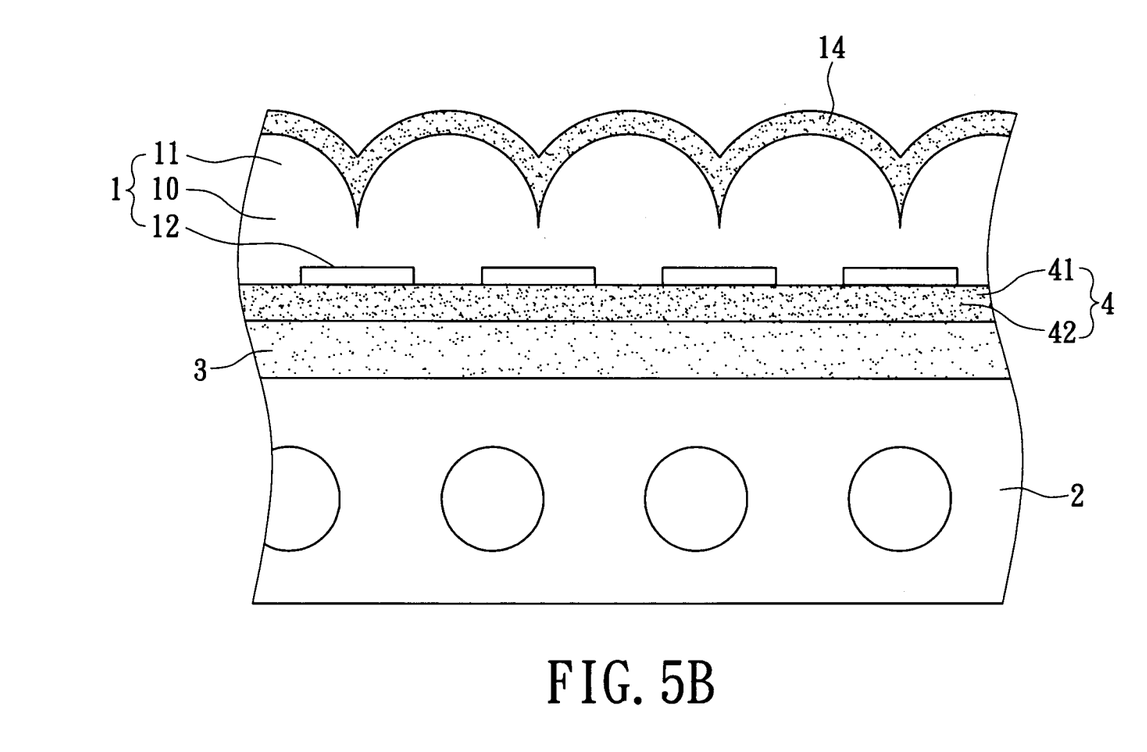
FIG. 5B is a schematic diagram of the rectangular reflection structure of the composite diffuser structure and the backlight module of the second embodiment of the present invention.

FIGS. 4 and 4A show the second embodiment. There is an adhering layer 4 between the composite diffuser structure 1 and the diffuser unit 3. Thereby, the composite diffuser structure 1 is adhered on the diffuser unit 3 via the adhering layer 4, so that the structure strength of the backlight module is enhanced and the problem of the backlight module be scratched by the optical elements due to external force is prevented. The adhering layer 4 includes an adhering coating 41 and a plurality of transparent particles 42. The adhering coating 41 is a transparent coating. The diameter of the transparent particles 42 is between 0.5 μm and 30 μm. The transparent particles 42 are added into the adhering coating 41 in a weight ratio of 0.01%~50%. The difference of the refraction indices between the transparent particles 42 and the adhering coating 41 is between +0.5 and −0.5. Similarly, the diffuser layer 14 is located on the lenticular structure 11 to adjust the diffusivity of the light beam to increase the view angle of the display screen. The thickness of the adhering layer is from 0.1 μm to 5 mm. Reference is made to FIGS. 5A and 5B. The reflection structure 12 can be in a semicircular-shape, an elliptical-shape, a triangular-shape, a rectangular-shape, or other shapes with concave structure (related to the direction of the incident light). By using the reflection structures 12, the light beam with a wide angle can be guided to the desired direction. In this embodiment, the composite diffuser structure 1 is the same as the first embodiment. For example, each of the openings 121 is located below the corresponding lenticular lens 110. The lenticular lens 110 has a first width A, the opening 121 has a second width B, and the second width B is 1/3~1/100 first width A. The other structures referred to the first embodiment are not illustrated herein again.

The present invention has the following beneficial characteristics.

1. The composite diffuser structure is provided to increase the brightness of the backlight source, to increase the diffusivity of the light beam, and to provide a better front view brightness and a wider view angle of the display screen.

2. The composite diffuser structure, a light source and a diffuser form a backlight module to improve the quality of the light beam outputted form the backlight module.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A composite diffuser structure, comprising:
a transparent layer having a light-entering surface and a light-emitting surface;
a lenticular structure having a plurality of lenticular lenses formed on the light-emitting surface, wherein each of the lenticular lenses has a first width; and
a plurality of reflection structures located on the light-entering surface, wherein there is an opening between two adjacent reflection structures, each of the openings having a second width, and the second width being between one third of the first width and one hundredth of the first width.

2. The composite diffuser structure as claimed in claim 1, further comprising a diffuser layer located above the lenticular structure.

3. The composite diffuser structure as claimed in claim 2, wherein the diffuser layer includes a transparent material layer and a plurality of particles disposed in the transparent material layer.

4. The composite diffuser structure as claimed in claim 3, wherein the particles are added into the transparent material layer in a weight ratio of 0.01%~50%, and the difference of the refraction indices between the particles and the transparent material layer is from −0.5 to +0.5.

5. The composite diffuser structure as claimed in claim 4, wherein the particle is made of polymethylmethacrylate (PMMA), polycarbonate (PC), or polystyrene (PS), and the diameter of the particles is between 0.5 μm and 30 μm.

6. The composite diffuser structure as claimed in claim 3, wherein the transparent material layer is made of polycarbonate (PC), polyethylene naphthalate (PEN), or polyethylene terephthlate (PET).

7. The composite diffuser structure as claimed in claim 3, wherein the transparent material layer is made of UV resin, heat-hardening resin, or epoxy.

8. The composite diffuser structure as claimed in claim 1, wherein the transparent layer is made of polycarbonate (PC), polyethylene naphthalate (PEN), or polyethylene terephthlate (PET).

9. The composite diffuser structure as claimed in claim 1, wherein each of the openings is located below the corresponding lenticular lens.

10. A backlight module, comprising:
a light source;
a diffuser unit located above the light source; and
a composite diffuser structure located above the diffuser unit, wherein the composite diffuser structure comprises:
a transparent layer having a light-entering surface and a light-emitting surface;
a lenticular structure having a plurality of lenticular lenses formed on the light-emitting surface, wherein each of the lenticular lenses has a first width; and
a plurality of reflection structures located on the light-entering surface, wherein there is an opening between two adjacent reflection structures, each of the openings having a second width, and the second width being between one third of the first width and one hundredth of the first width.

11. The backlight module as claimed in claim 10, wherein there is a gap between the diffuser unit and the composite diffuser structure.

12. The backlight module as claimed in claim 10, further comprising an adhering layer located between the diffuser unit and the composite diffuser structure, wherein the composite diffuser structure is adhered onto the diffuser unit via the adhering layer.

13. The backlight module as claimed in claim 12, wherein the adhering layer includes an adhering coating and a plurality of transparent particles.

14. The backlight module as claimed in claim 13, wherein the adhering layer is a transparent coating, the transparent particles are added into the adhering coating in a weight ratio of 0.01%~50%, and the difference of the refraction indices between the transparent particles and the adhering coating is from −0.5 to +0.5.

15. The backlight module as claimed in claim 12, wherein the thickness of the adhering layer is from 0.1 μm to 5 mm.

16. The backlight module as claimed in claim 10, further comprising a diffuser layer located on the lenticular structure.

17. The backlight module as claimed in claim 16, wherein the diffuser layer includes a plurality of diffuse particles, and the diffuse particles are added into the diffuser layer in a weight ratio of 0.01%~50%.

18. The backlight module as claimed in claim 10, wherein each of the openings is located below the corresponding lenticular lens.

* * * * *